March 22, 1927. 1,621,550
J. LEHR
RUBBER SPONGE AND METHOD OF MAKING SAME
Filed Oct. 2, 1926

Inventor:
John Lehr,
by Middleton Donaldson Hall
Attys.

Patented Mar. 22, 1927.

1,621,550

UNITED STATES PATENT OFFICE.

JOHN LEHR, OF AKRON, OHIO, ASSIGNOR TO THE MILLER RUBBER COMPANY, OF AKRON, OHIO, A CORPORATION OF OHIO.

RUBBER SPONGE AND METHOD OF MAKING SAME.

Application filed October 2, 1926. Serial No. 139,160.

My present invention relates to a development or modification of the sponge which forms the subject of Letters Patent of the United States granted to The Miller Rubber Company as my assignee on the 7th day of September, 1926, #1,599,054.

The invention aims to provide a novel and attractive article of markedly distinctive appearance, and said invention includes the novel article and method of making the same as hereinafter described and defined by the appended claims.

In order that the invention may be readily understood reference is made to the accompanying drawings in which:—

Figure 1:
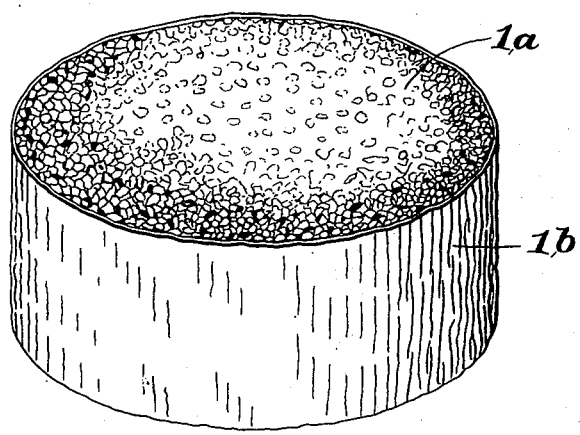
Figure 1 is a perspective view of a block of rubber such as used for making my novel article by my said process.
Figure 2:
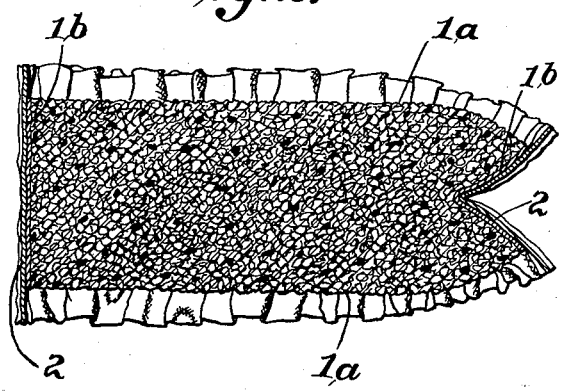
Fig. 2 is a transverse sectional view of the same with the pleated sheet applied and one edge partially folded.
Figure 3:
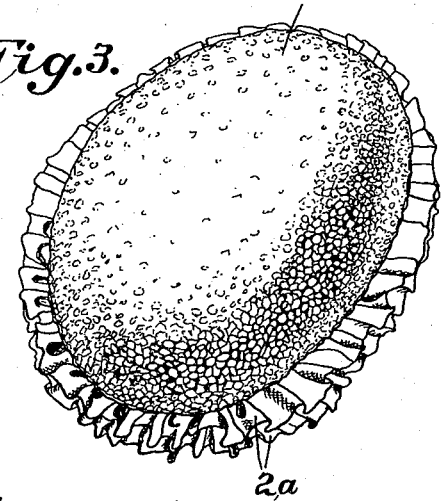
Fig. 3 is a perspective view of the completed article.

In proceeding to manufacture my improved sponge I provide a block of rubber of substantially cylindrical shape, (though the same may be elliptical,) as shown in Fig. 1 having parallel faces with exposed cells as indicated at 1ª and a peripheral skin 1ᵇ, which block may be produced as set forth in the patent above noted. To this peripheral skin I cement a band or ring of pleated or fluted sheet rubber as indicated at 2. The outer or exposed face of this band being rendered sticky or adherent as by the application of cement the peripheral face of the block and attached band are folded on a median line progressively around the entire circumference as indicated in Fig. 3 until the folded edges are caused to clamp the folded pleated strip or band therebetween, the adhesive coating on the outer face of the band causing the folded portions to be held in engagement as shown in Fig. 3. The band being wider than the peripheral face of the block this provides a projecting pleated or fluted skirt as indicated at 2ª in Fig. 3.

Figure 4:
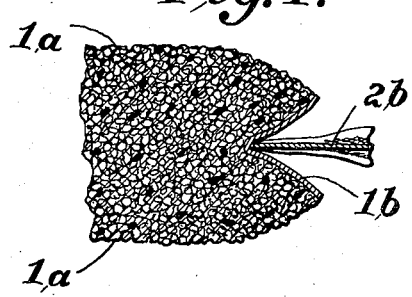
Fig. 4 is a fragmentary sectional detail illustrating a modification.

Instead of using a wide band to produce a double skirt a narrow band might be used to provide a skirt of a single layer as shown in Fig. 4.

I claim:

1. A rubber sponge having a skirt of sheet rubber projecting from the margin thereof.

2. A rubber sponge having a skirt of pleated sheet rubber projecting therefrom.

3. A rubber sponge comprising a cylindrical block of rubber having its peripheral edge folded on a median line and an annular band of pleated sheet rubber embraced between the folded edge portions and cemented thereto.

4. A rubber sponge comprising a block of rubber having a peripheral edge folded on a median line and a circular band of pleated rubber held between the folds of the edge, the faces of the folded edge and band being adhesively secured together and the band having a free edge projecting beyond the peripheral surface of the sponge.

5. The method of making rubber sponges from substantially cylindrical blocks of rubber having exposed cells on the parallel faces and a peripheral skin which consists in juxtaposing to said peripheral skin an ornamental rubber strip and progressively folding the skin on a median line to embrace a portion of said rubber strip leaving a marginal portion projecting beyond the juxtaposed edges and cementing the juxtaposed parts together.

6. The method of making a rubber sponge from a substantially cylindrical block of rubber having exposed cells on its parallel faces and a peripheral skin which consists in adhesively securing to said peripheral skin an ornamental band of sheet rubber of greater width than said skin, folding the skin and attached band on a median line, to bring the portions on each side of said median line in juxtaposition, and adhesively connecting said juxtaposed faces.

In testimony whereof, I affix my signature.

JOHN LEHR.